April 5, 1932. L. M. DODAMEAD 1,852,958
INTERNAL COMBUSTION ENGINE
Filed June 20, 1929 6 Sheets-Sheet 1

WITNESS
C. B. Skillinger

INVENTOR
L. M. Dodamead
BY
ATTORNEY

April 5, 1932.   L. M. DODAMEAD   1,852,958
INTERNAL COMBUSTION ENGINE
Filed June 20, 1929   6 Sheets-Sheet 2
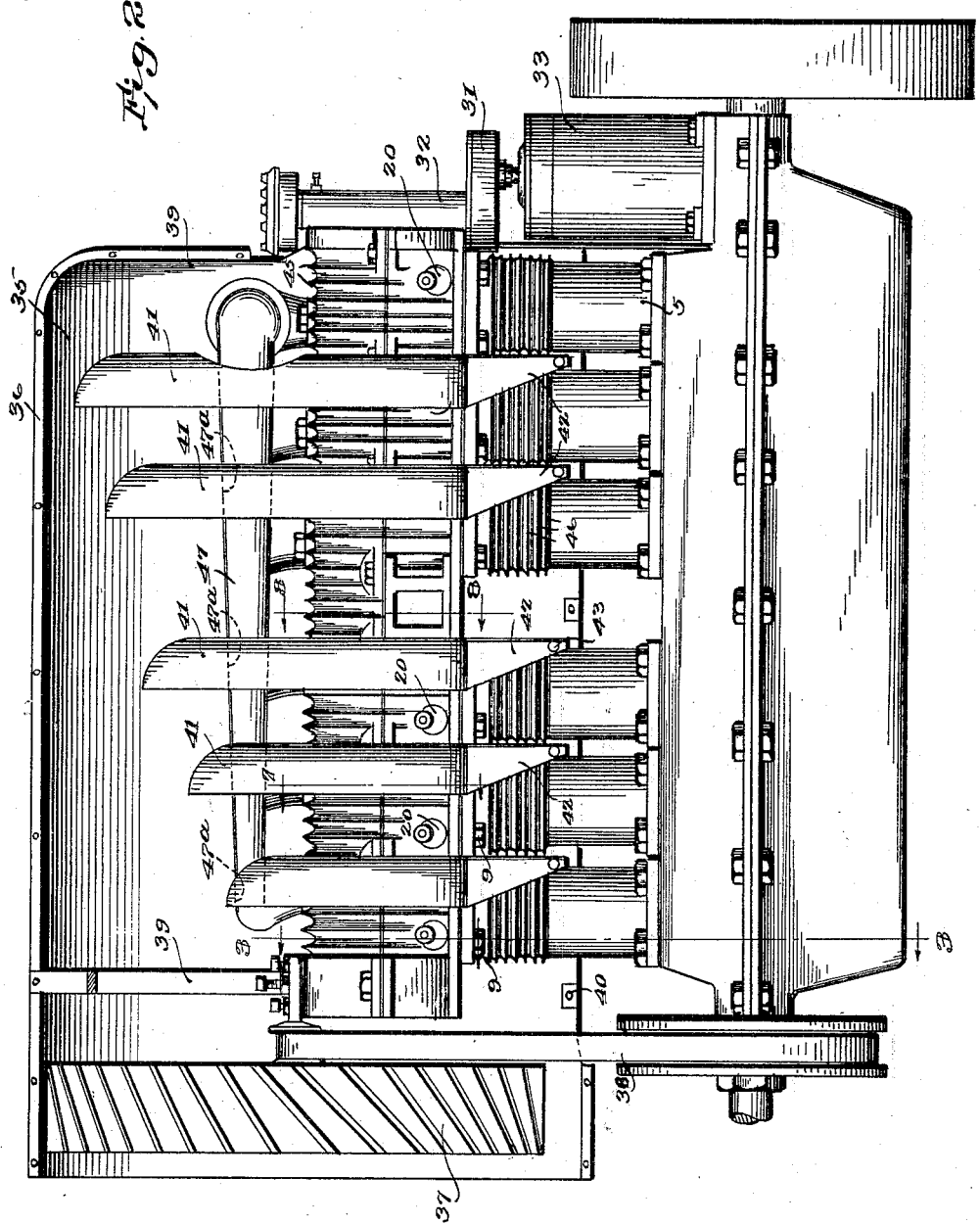
WITNESS.
C. B. Shillinger
INVENTOR
L. M. Dodamead.
BY
Munn & Co.
ATTORNEY

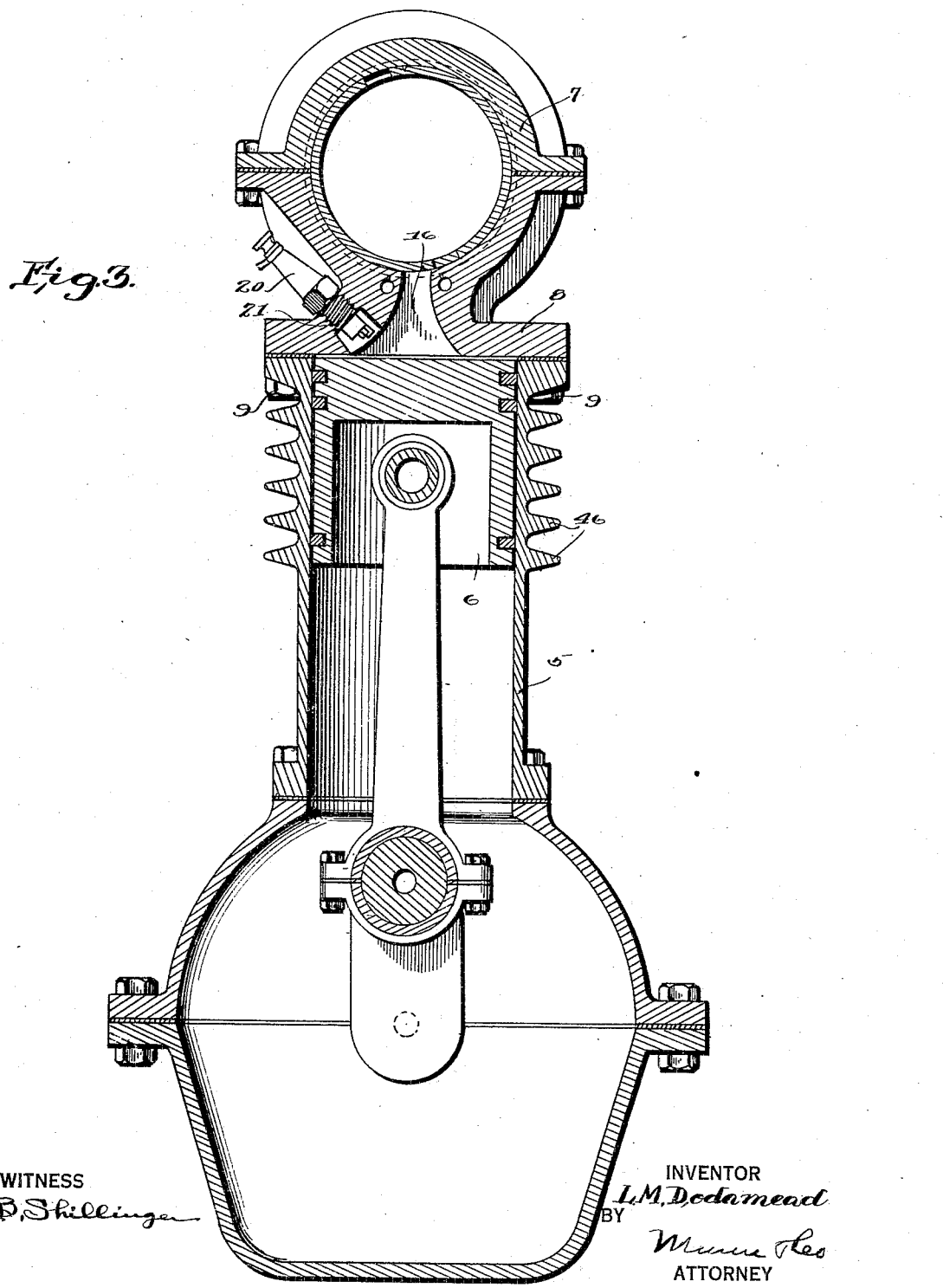

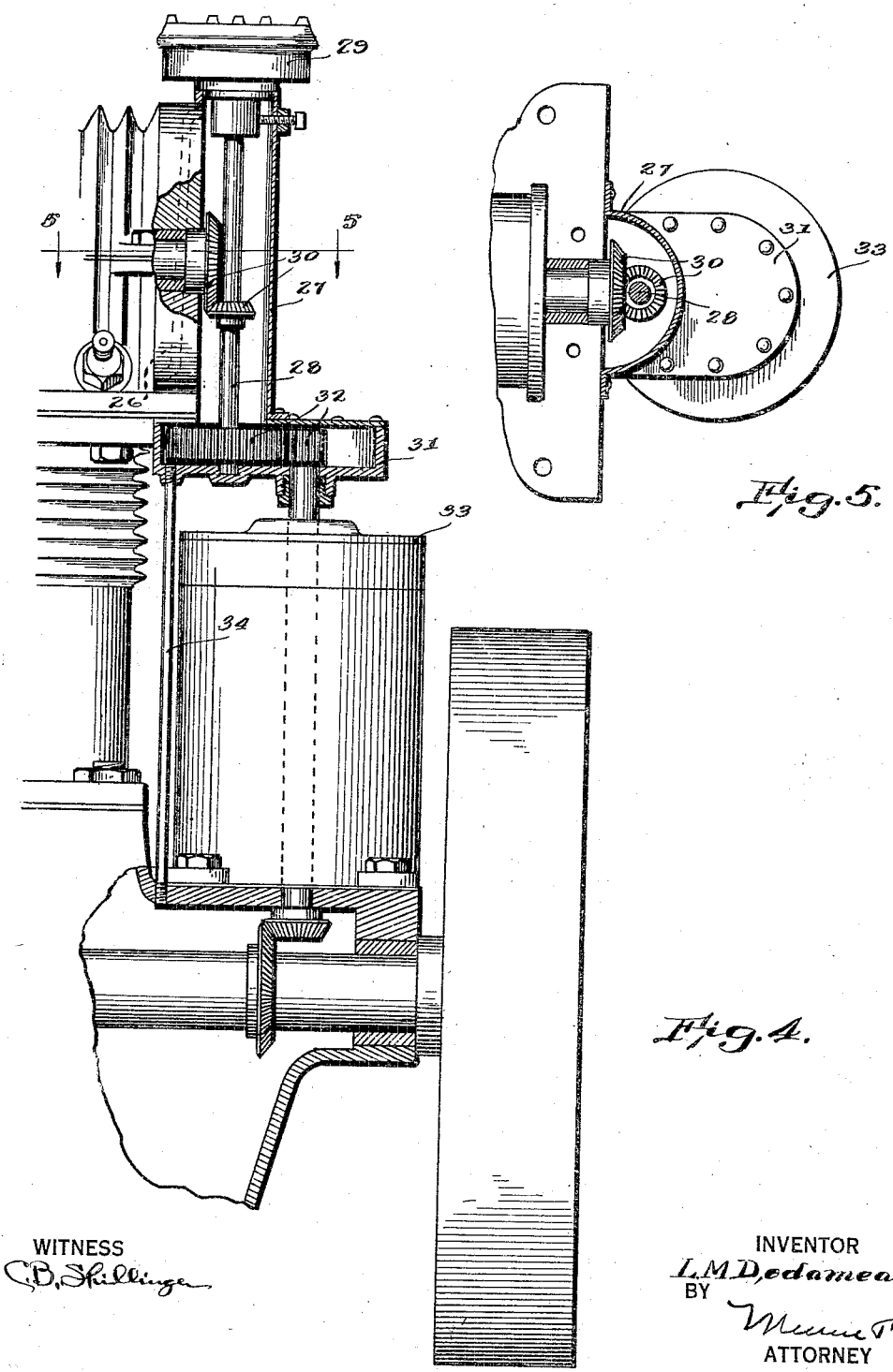

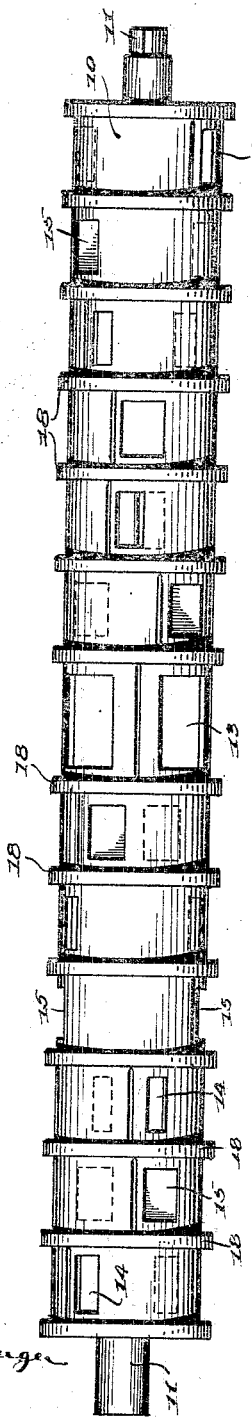

April 5, 1932.  L. M. DODAMEAD  1,852,958
INTERNAL COMBUSTION ENGINE
Filed June 20, 1929  6 Sheets-Sheet 6

WITNESS
C.B.Shillinger

INVENTOR
L. M. Dodamead
BY
Munn & Co.
ATTORNEY

Patented Apr. 5, 1932

1,852,958

UNITED STATES PATENT OFFICE

LLOYD M. DODAMEAD, OF NORFOLK, VIRGINIA

INTERNAL COMBUSTION ENGINE

Application filed June 20, 1929. Serial No. 372,451.

My invention relates to internal combustion engines and more particularly to those of the rotary sleeve valve type.

An object of the present invention is to provide a light, comparatively silent air-cooled engine which is positive in operation and which reduces the number of small moving parts to a minimum.

Further the invention provides an air cooling system embodying a hood which embraces the usual fan and upper part of the motor and a plurality of air deflectors arranged to catch the currents of air from the fan and direct the same over the engine cylinders.

The invention also provides a rotary sleeve valve which serves the added function of an exhaust manifold for the engine.

An additional object of the invention resides in the provision of a lubrication system wherein the valve casing is provided with a main lubricant bore having communication with the interior of the casing at various points to supply lubricant to the valve and leads to other rotatable parts of the engine such as the generator gearing.

With the preceding and other objects and advantages in mind, the invention consists in the novel combination of elements, constructions and arrangements of parts and operations to be hereinafter more fully described, claimed and illustrated in the accompanying drawings, wherein:

Fig. 2 is a side elevation of the same; and showing half of the cooling or ventilating hood removed;

Fig. 3 is a vertical sectional view taken on the line 3—3 of Fig. 2;

Fig. 4 is a fragmentary detail view partly in elevation and partly in section;

Fig. 5 is a horizontal sectional view taken on substantially the line 5—5 of Fig. 4;

Fig. 6 is an elevation of the rotary valve embodied in the invention;

Fig. 7 is a vertical section taken on substantially the line 7—7 of Fig. 2;

Fig. 8 is a similar view taken on line 8—8 of Fig. 2;

Figure 10:
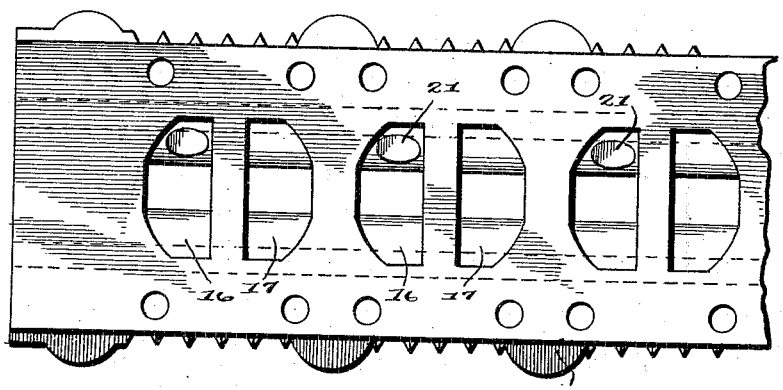
Fig. 10 is a fragmentary bottom plan view of the valve casing.
Figure 11:
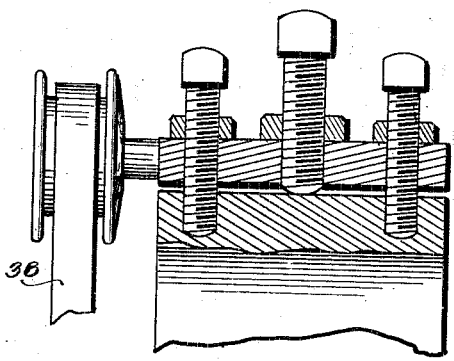
Fig. 11 is an enlarged detail view illustrating the fan belt adjusting means.

Referring to the invention in detail an internal combustion engine having vertical cylinders 5 in which reciprocatory pistons 6 are arranged is provided. Extending longitudinally of the engine is a circular two-part valve casing 7 the lower part of which is formed with a rectangular plate 8 which is secured to the upper ends of the cylinders by suitable fastenings 9. A hollow rotary valve 10 is rotatably mounted within the casing and is equipped with stub shafts 11 at its ends and which project laterally therefrom and are journaled in the end walls of the casing as at 12. At a point centrally of its ends the valve is provided with a plurality of spaced inlet ports 13 to receive combustible mixture from a suitable carbureter. For each cylinder 5 the valve is provided with a set of intake and exhaust ports designated at 14 and 15, respectively, and which are adapted to communicate with the cylinder 5 at predetermined times by way of intakes and exhaust openings 16 and 17 provided in the plate 8. Annular packing rings or ribs 18 are formed on the valve upon opposite sides of the port therein and are revoluble in circumferential grooves formed upon the interior of the valve casing. As particularly illustrated in Figs. 3 and 10 the ports 16 and 17 are flared and have their side walls oppositely curved so as to obviate irregular surfaces or obstructions which may tend to retard the passage of combustible mixture and exhaust gases through these ports. To ignite the combustible mixture passing through the intake port 15 a spark plug 20 is provided for each cylinder and is threaded into a transverse opening 21 formed in the plate 8 and communicating with one of the ports 15. Each two exhaust ports 15 and 16 are diametrically opposed and are connected by a rectangular conduit 20 extending transversely through the valve and is adapted to establish communication between exhausts outlets 21 in the valve casing and corresponding exhaust openings 17 in the plate 8 when the valve is in the position disclosed in Fig. 7. It will thus be seen that each half revolution brings one of each pair of intake ports 14 and 15 in registration with the corresponding intakes 16 in the plate 8 and that the exhaust conduits reach exhaust position subsequent to each closing of one of these ports 14 and 15.

In order to supply combustible mixture to the rotary valve, the valve casing is formed with a laterally extending hollow casting 22 at a point in transverse alignment with the intakes 13. The outer end of this casting is adapted to be connected with a suitable carbureter. It follows that combustible mixture flowing into the hollow casting 22 will pass through the openings 13 and pass longitudinally through the valve in opposite directions and it is conducted to the various cylinders through the intake ports above referred to.

For the purpose of supplying lubricant to the rotatable valve one side of the casing is formed with a longitudinally extending lubricant bore 23 having lateral branches 24 which open into the grooves 19. At one end of the valve casing a branch 25 extends from the bore 23 to one of the stub shafts 11. At its rear end the valve casing is formed with a vertically extending bore 26 which communicates with the adjacent end of the bore 23 and opens into the upper end of a casing 27 in which the shaft 28 of a suitable primer 29 is mounted, the latter being driven through gearing 30. A gear housing 31 is arranged along the casing 27 and houses the gears 32 of a vertical generator 33. A drain pipe 34 extends from the gear housing 31 through the crank case of the engine and conducts all surplus lubricant from the rotatable parts in the casings 26 and 31 back to the crank case.

The invention also provides a cooling or ventilating structure which consists of a horizontally arranged circular casing which extends the entire length of the engine and embraces the engine head and cylinders. This casing consists of semi-circular sections 35 having flanges 36 at their ends which are secured together by transverse fastenings 37. As particularly illustrated in Fig. 2 the forward end of the casing is open and is of such diameter as to receive the usual ventilating fan 37a which is driven from a fan belt 38. The rear ends of the sections have depending vertical portions 39 which are curved laterally toward each other to hold the casing at this end. The casing is supported on the engine by an inverted V-shaped bracket 38 which is mounted on and arises from the forward end of the valve casing and has its upper end secured between the flanges 36. The lower longitudinal edges of the sections extend a considerable distance along the upper ends of the cylinders and are secured to the latter by transverse bolts 40 passing between the cylinders and engaged with the opposed portions of the sections.

Figure 1:
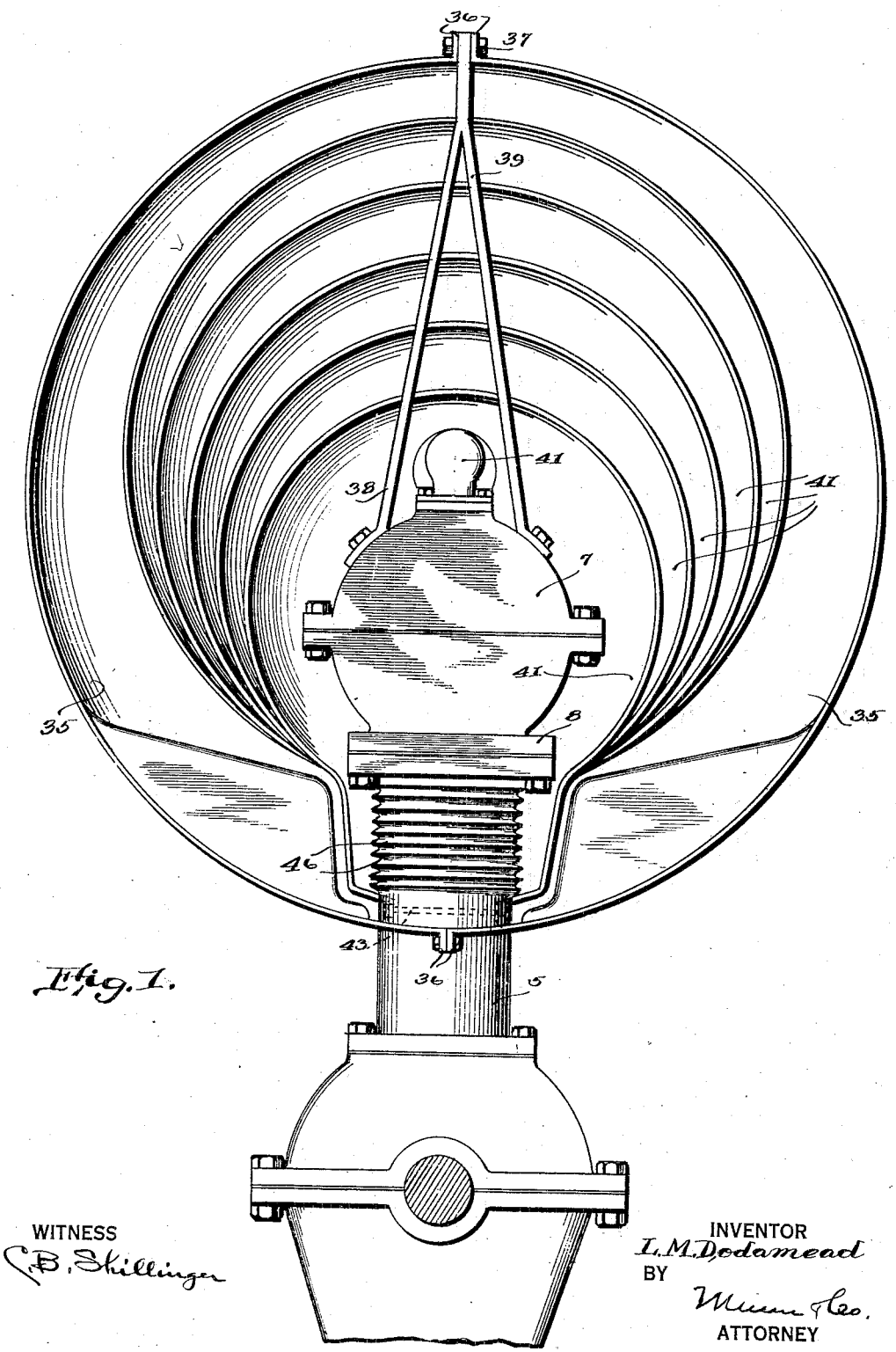
Figure 1 is an end elevation of an internal combustion engine constructed in accordance with my invention.
Figure 9:
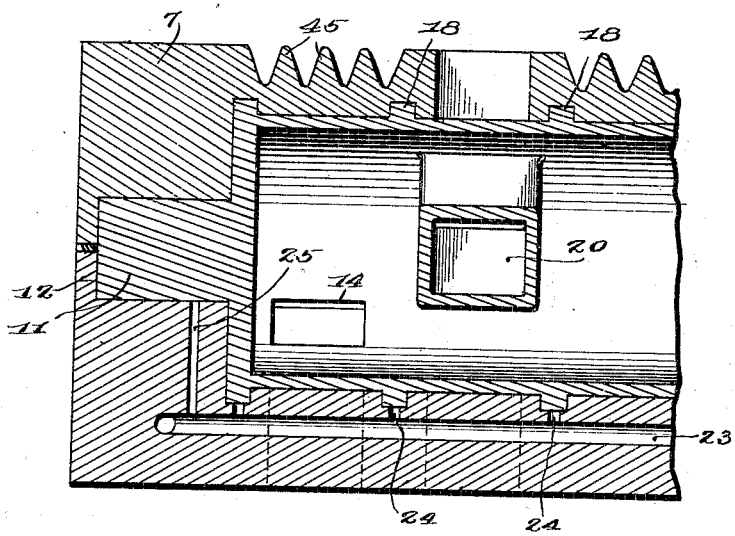
Fig. 9 is an enlarged fragmentary longitudinally sectional view of the valve and surrounding valve casing.

In order to distribute the air passing rearwardly in the casing from the van to the various cylinders a plurality of circular concavo-convex air deflectors 41 is provided. These deflectors 41 are graduated in diameter and are arranged with the smallest one adjacent the frame. Each air deflector is positioned between two adjacent cylinders and has an eccentric opening which receives the valve casing. The lower end of each of these distributors is formed with a pair of depending side wings 42 extending down along the opposite sides of its corresponding cylinder in spaced relation thereto as disclosed in Fig. 1. The lower ends of these side wings are attached to the engine block by transverse fastenings 43. Inasmuch as the deflectors are of graduated diameters some of the air from the fan 37 will strike each of the deflectors and be discharged downwardly around the cylinders. To further aid the cooling of the engine the valve casing is formed with circumferential cooling fins 45 and the cylinders are provided with similar fins 46.

An exhaust manifold 47 is arranged upon the upper section of the valve casing and communicates with the exhaust ports therein. Longitudinally aligned openings 47a are provided in the deflectors through which the exhaust manifold 47 extends.

With reference to the cooling or ventilating system it follows that the air drawn into the forward end of the casing 35 is carried rearwardly to the casing where it strikes the deflectors 41. By reason of the dished or concave configuration of the deflectors the air is deflected downwardly over the respective cylinders.

What is claimed is:

1. In an air cooling apparatus for internal combustion engines, a casing to embrace the upper portion of an engine, a plurality of vertically disposed substantially circular deflectors of concavo-convex cross section of graduated diameters supported on said engine within the casing, each of said deflectors having a cut out portion for the reception of the upper portion of said engine and having depending wing portions formed at either side of said cut out portion for straddling said engine, and fastening means extending through said wing portions.

2. A cooling device for internal combustion engines comprising a vertically disposed substantially circular concavo-convex member air deflector adapted to be supported on the upper portion of an internal combustion engine with its convex face facing forwardly, and a pair of depending attaching flanges formed on the lower edge of the deflector, arranged on either side of said engine and adapted to be detachably secured to the engine block.

3. As an article of manufacture, a cooling attachment for internal combustion engines comprising a substantially circular dish shaped member having a cut out portion at one side thereof, and extending wing portions formed at either side of said cut out portion.

4. In an air cooling apparatus for internal combustion engines, a casing enclosing the upper portion of said engine and forming a passage therearound, and a plurality of vertically disposed deflector plates mounted upon said engine within said passage, said reflector plates being of increasing area from the front to the rear of said engine and having depending side wings extending downwardly at each side of said engine.

5. In an air cooling apparatus for internal combustion engines having longitudinally arranged cylinders, an elongated casing enclosing said cylinders and forming an air passage therearound, said casing being open at the forward end and partially closed at the rearward end for deflecting air downwardly over the rear end of said engine, and a plurality of longitudinally spaced vertically disposed deflector plates mounted upon said engine within said air passage, said deflector plates and depending side wings extending downwardly at either side of and between the cylinders of said engine, and fastening means extending between said cylinders and connecting said side wings.

6. In an air cooling apparatus for internal combustion engines, a substantially circular casing consisting of a pair of complementary sections adapted to enclose the upper portion of an internal combustion engine and to form a longitudinally extending air passage therearound, a plurality of upstanding concavo-convex air deflecting members supported on said engine in longitudinally spaced relation within said casing, said air deflecting members being of graduated diameters and arranged with the smallest member adjacent the forward end of said casing, each of said air deflecting members having a wing depending from the lower edge thereof at each side of said engine, said wings being disposed between adjacent cylinders of said engine.

LLOYD M. DODAMEAD